United States Patent [19]

McInnis

[11] Patent Number: 4,520,979
[45] Date of Patent: Jun. 4, 1985

[54] HANGER AND METHOD FOR SUSPENDING A TELEVISION

[76] Inventor: Donald E. McInnis, 1611 Elwood Dr., Los Gatos, Calif. 95030

[21] Appl. No.: 362,834

[22] Filed: Mar. 29, 1982

[51] Int. Cl.³ .......................................... F16M 13/02
[52] U.S. Cl. .................................... 248/323; 248/317
[58] Field of Search ............... 248/317, 323, 671, 318, 248/544; 211/117; 294/74, 77

[56] References Cited

U.S. PATENT DOCUMENTS

| | | | |
|---|---|---|---|
| 136,059 | 2/1873 | Hohorst | 294/77 |
| 363,113 | 5/1887 | Burrell et al. | 294/77 |
| 3,165,346 | 1/1965 | Pugh | 294/77 |
| 3,662,981 | 5/1972 | Hogrebe | 248/278 |
| 3,762,507 | 10/1973 | Starr | 182/4 X |
| 3,837,697 | 9/1974 | Goodrich | 294/74 |
| 3,860,089 | 1/1975 | Huggett | 182/4 |
| 4,101,109 | 7/1978 | Edwards | 248/317 |
| 4,227,669 | 10/1980 | McInnis | 248/317 |
| 4,417,714 | 11/1983 | Charm | 248/323 |

Primary Examiner—J. Franklin Foss
Attorney, Agent, or Firm—Gerald L. Moore

[57] ABSTRACT

A macrame suspender for a television (10) wherein a cradle (26) is supported by a plurality of support ropes (28) extending primarily to the two sides of the television and attached at the extending ends to the ceiling. Additional ropes (34) extend along the rear wall (16) of the cabinet to allow the television to be positioned with the center of gravity to the rear of the cradle. A plurality of ropes (36) also extend along a portion of the cabinet front wall to prevent the set from sliding forward from the cradle and a safety rope (40) having one end attached to the cradle and the other end attached to the cabinet prevents the television from separating from the cradle.

2 Claims, 5 Drawing Figures

HANGER AND METHOD FOR SUSPENDING A TELEVISION

FIELD OF THE INVENTION

This invention relates to a hanger for suspending a television set from the ceiling.

BACKGROUND OF THE INVENTION

Television sets are frequently cumbersome making them difficult to place in the room where everyone can see clearly. The present invention teaches the suspending of the television set from the ceiling in a hanger. By so doing, floor space is saved and the set is placed high enough so it can be easily seen.

Particularly in the bedroom, it is important that the set be placed at a high elevation for easy viewing. However, such placement of the set is difficult because the unit is large and relatively heavy. These factors must also be considered in devising an apparatus for suspending a set. Additionally, any such suspending apparatus must be relatively pleasing in appearance to add to the decor of the room.

It is therefore the primary object of the present invention to provide a safe suspender for a television set which allows adjustment of the set attitude for easy viewing.

SUMMARY OF THE INVENTION

A suspender for a television set comprising a cradle, sized to fit beneath the base of the set and a plurality of support lines extending in two directions to the side of the cradle, means for attaching the extending ends of the support lines to the ceiling, a safety line fixed at one end to the cradle and fixed at the other end to the television set, at least some of said lines extending across a portion of the front and back walls of the television set to supply front to back support therefor.

DESCRIPTION OF THE INVENTION

Figure 2:
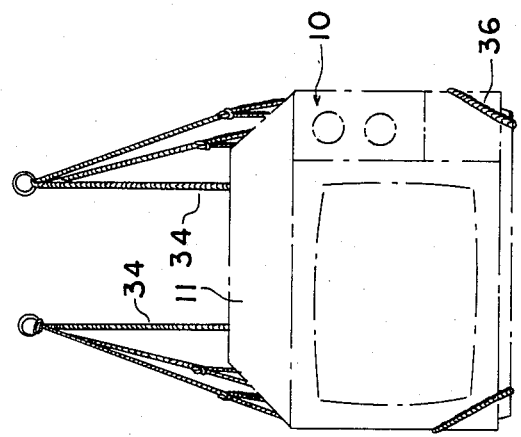
FIG. 2 is a front view of the television set in the suspender.
Figure 1:
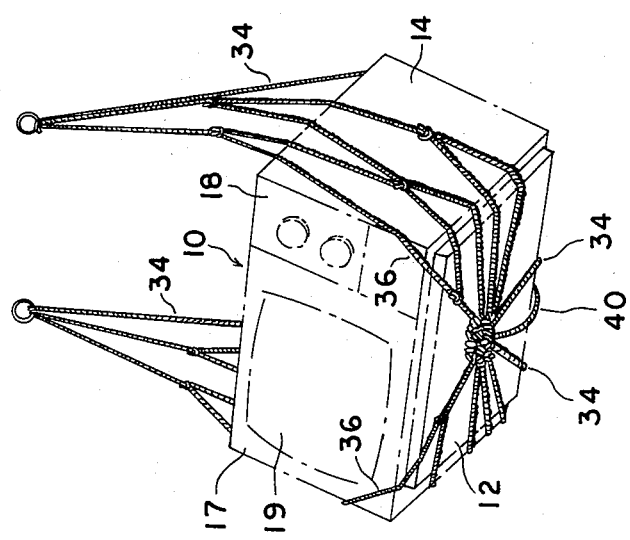
FIG. 1 is a perspective view of the suspender supporting a television set.

In FIGS. 1 and 2 are shown a typical television set comprising a cabinet 10 having a top wall 11, a bottom wall 12, side walls 14 and 15, and a rear wall 16. A front wall 17 includes a control panel 18 and the viewing face 19. A handle 20 is fixed to the top wall 11 and there are also spaced cord storage hooks 21 fixed to the rear wall 16. The television set shown in the drawing is a typical portable unit generally having a screen size of from 13 inches to 19 inches diagonal length.

Figure 3:
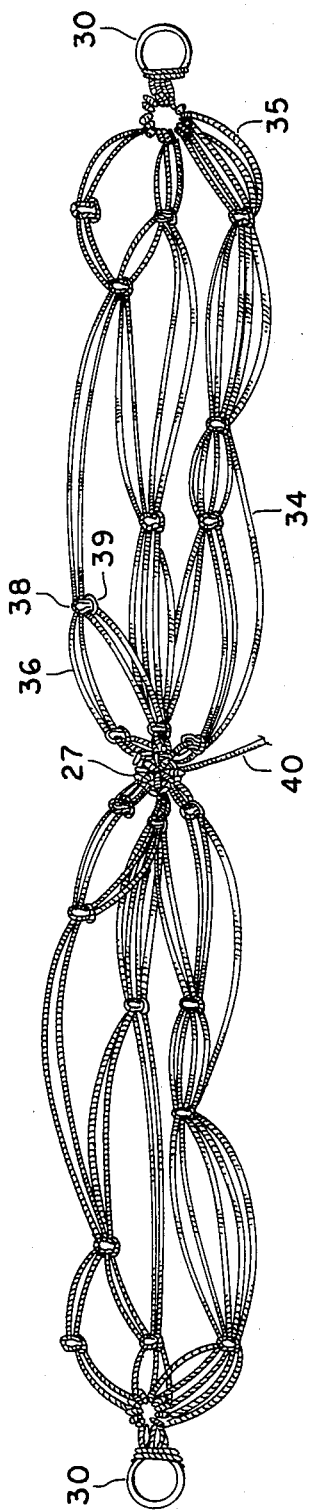
FIG. 3 shows the suspender.

In accordance with the present invention, there is provided a hanger 25 (FIG. 3) for supporting the television set from the ceiling or other structure. The hanger comprises a cradle or cradle area 26 made up of a base 27 and a series of crosstied support ropes 28. The cradle includes a geometric center that is located so as to be positioned forward of the center of gravity of the television set for reasons to be explained later.

In one preferred embodiment the suspender is a macrame type formed of macrame knots 29, joining a plurality of support lines with the knot base 27 and support rings 30 fixed to each end. The overall function of the macrame is to cradle the set in a manner to allow adjustment of the attitude for proper viewing and also in a manner to permit safe support from a ceiling. Thus, the support lines 31 and 32 extend from the knot base and along the side walls 14 and 15 of the set to serve as the main weight bearing members for the television set.

Figure 4A:
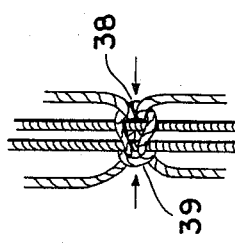
FIG. 4 is a close up view of one of the suspender knots.
Figure 4B:
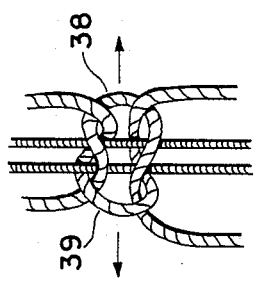

To provide stability, one or more cords 34 are extended from the rear side of the knot base up to the knot areas 35 to each side of the knot base and adjacent the support rings 30. These cords shown in FIG. 3 extend along the back wall 16 of the cabinet and prevent the tipping of the set backward out of the suspender cradle since the center of gravity is rearward of the geometric center of the cradle. Additionally, there are provided forward lines 36 which are fastened by the knot 37 to the next adjacent line and are positioned to extend across the lower front corner of the cabinet. These lines prevent the set from sliding or tipping forward from the cradle. Additionally, the position of the knots 37 can be adjusted in the manner shown in FIG. 4. By pulling on the loops 38 and 39 the knot can be loosened in the manner shown in step 2 for adjustment of the knot position up or down so that the rope 36 merely extends across the front lower corner of the cabinet. This allows for unimpeded viewing of the screen while providing for support of the cabinet.

In accordance with another feature of the invention, the base 27 is positioned forward of the center of gravity of the television. This positioning allows for forward tilting of the cabinet for better viewing from a position below the screen without the possibility of the set rolling forward out of the suspender. The back straps 34 are longer than the other straps thus allowing the center of gravity of the television to rest behind the base of the cradle.

Figure 5:
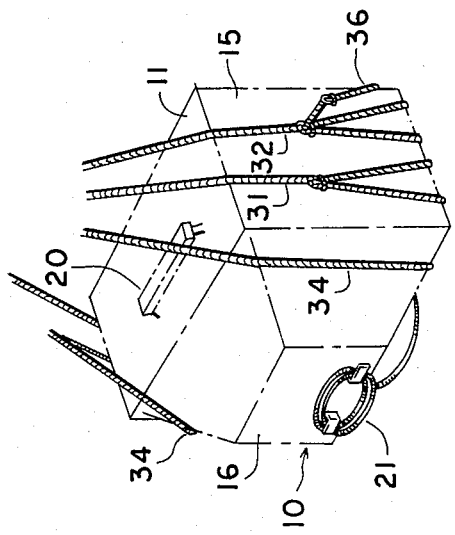
FIG. 5 is a rear perspective view of the suspender and television.

As an additional safety feature, a safety cord 40 is fixed to the knot base and tied to the storage hooks 21 in the manner shown in FIG. 5. The safety cord can also be tied to the handle 20 of the cabinet. This safety cord serves to support the set if it should become dislodged from the suspender.

I claim:

1. A suspender for suspending a television set from the ceiling and wherein the set has a center of gravity and includes top, bottom, side, front and back walls and includes a handle and a cord bracket fixed to one wall, said suspender comprising:
   a cradle having a geometrical center and being sized to receive and support the television set;
   a plurality of supporting ropes extending two opposite directions from the cradle and upward along the side walls of the set;
   one or more ropes extending from said cradle and upward along the edge of the front wall of the set;
   one or more ropes extending from said cradle and upward along the back wall of the set;
   said ropes being sized to permit the positioning of the cradle adjacent the bottom wall of the set with the geometric center thereof formed of the center of gravity of the television set to allow a forward tilting of the set for better viewing of the front wall thereof;

means to attach the extending ends of said ropes to the ceiling; and a safety cord having one end fixed to said cradle and the other end fixed to the set to prevent the set from rolling off the cradle and falling to the floor.

2. A suspender as defined in claim 1 wherein said means to attach includes separate attachments on the ceiling for the ropes extending in said opposite directions.

* * * * *